United States Patent
Seseke-Koyro et al.

(10) Patent No.: US 6,432,221 B1
(45) Date of Patent: Aug. 13, 2002

(54) FLUXING AGENTS

(75) Inventors: Ulrich Seseke-Koyro, Vellmar; Joachim Frehse, Hannover; Andreas Becker, Lachendorf, all of (DE)

(73) Assignee: Solvay Fluor und Derivate GmbH, Hannover (DE)

( * ) Notice: Subject to any disclaimer, the term of this patent is extended or adjusted under 35 U.S.C. 154(b) by 0 days.

(21) Appl. No.: 09/646,955

(22) PCT Filed: Mar. 23, 1999

(86) PCT No.: PCT/DE99/00851

§ 371 (c)(1),
(2), (4) Date: Nov. 15, 2000

(87) PCT Pub. No.: WO99/48641

PCT Pub. Date: Sep. 30, 1999

(30) Foreign Application Priority Data

Mar. 25, 1998 (DE) .................................... 198 13 023

(51) Int. Cl.[7] ...................... B23K 35/363; B23K 35/365
(52) U.S. Cl. .......................................... 148/24; 148/26
(58) Field of Search ..................... 148/26, 24; 228/207, 228/262.51

(56) References Cited

U.S. PATENT DOCUMENTS 3,733,458 A * 5/1973 Pokhodnya et al. ........ 219/146
4,689,092 A * 8/1987 Suzuki et al. .................. 148/26
4,906,307 A * 3/1990 Fujiyoshi ...................... 148/26
5,785,770 A * 7/1998 Meshri et al. ................. 148/26
6,019,856 A * 2/2000 Born et al. .................... 148/26

FOREIGN PATENT DOCUMENTS

| EP | 0131444 A | 1/1985 |
| EP | 0399050 A | 11/1990 |
| EP | 0659519 A | 6/1995 |
| GB | 1438955 A | 6/1976 |
| JP | 61293699 A | 12/1986 |
| JP | 62006774 A | 1/1987 |
| JP | 03099795 A | 4/1991 |

* cited by examiner

Primary Examiner—Daniel J. Jenkins
(74) Attorney, Agent, or Firm—Crowell & Moring LLP

(57) ABSTRACT

Components made of aluminum and aluminum alloys can be brazed at temperatures of up to 600° C. using a fluxing agent composed of alkali fluorozincate or alkali fluoride/zinc fluoride mixtures. Other fluxing agents, for example those composed of potassium fluoroaluminate can be used in addition. Alkali fluorozincate fluxing agents, especially potassium and cesium fluorozincate fluxing agents, act not only as a fluxing agent but also improve the surface quality since zinc and alkali fluoroaluminates are deposited on the surface of the components. The invention also relates to new fluxing agents containing alkali metal fluorozincates.

23 Claims, 7 Drawing Sheets

FLUXING AGENTS

BACKGROUND OF THE INVENTION

The invention relates to new fluxes for brazing aluminum and aluminum alloys, to a brazing method and brazed components.

Structural components (such as the radiator of automobiles or heat exchangers) of parts made from aluminum or aluminum alloys can be produced by brazing (hard soldering) these parts. Advantageously, a flux composed of a fluoroaluminate, which frees the surface of the parts that are to be brazed from oxide adhesions, is used. Fluxes composed of potassium fluoroaluminate are particularly suitable for aluminum or aluminum alloys containing little magnesium. Such a method is disclosed in the British patent 1,438,955. The production of appropriate fluxes is described, for example, by Willenberg, U.S. Pat. No. 4,428, 920 and Meshri, U.S. Pat. No. 5,318,746 as well as by Kawase, U.S. Pat. No. 4,579,605.

Fluxes, which contain fluoroaluminates of cesium are disclosed, for example, by Suzuki in U.S. Pat. No. 4,670,067 and by Shimizu in U.S. Pat. No. 5,171,377. Such fluxes, which may additionally also contain potassium fluoroaluminate fluxing agents, are particularly suitable for brazing aluminum alloys having a higher magnesium content.

U.S. Pat. No. 4,906,307 discloses a process for brazing components formed of aluminum alloys. In accordance with one embodiment it is envisioned that a fluxing agent will be used which contains $K_2SiF_6$, $ZnF_2$, NaF and $AlF_3$. Solder plated components are brazed.

For brazing, the fluxing agent (for example, in the form of a suspension) as well as a brazing metal are applied on the components which are to be joined. The components are brought together into the desired position and heated. Initially the fluxing agent melts and cleans the surface; after that, the solder melts. Subsequently, the parts are allowed to cool.

U.S. Pat. No. 5,190,596 teaches that, instead of a brazing metal, a metal can be added to the fluxing agent. During the brazing, this metal forms a eutectic with the aluminum. Suitable metals are copper, zinc and germanium and especially silicon.

The addition of certain metal fluorosilicates in particular amounts can make the brazing metal superfluous (see EP-A-810 057 and German patent application 196 36 897.9). The latter patent application discloses that a mixture of potassium fluoroaluminate fluxing agent and potassium fluorosilicate, in which the latter is contained in an amount of 6 to 50%, makes a brazing metal superfluous.

In the British patent 1,438,955, mentioned above, it is explained that smaller amounts of alkali metal zinc fluorides, up to 5 mole percent, can be tolerated in the fluxing agent. However, their presence does not bring about any advantages in relation to lowering the melting point. Instead, all have the effect of raising the melting point. Haramaki (U.S. Pat. No. 4,645,119) discloses fluxing agents composed of potassium fluoroaluminate, which contain 3 to 30 wt.-% of $ZnF_2$, optionally in the form of $KZnF_3$. The zinc fluoride decomposes at the brazing temperature and the metallic zinc covers the brazed parts or the whole surface of the components which are to be brazed to one another and provides the aluminum with improved protection against corrosion.

SUMMARY OF THE INVENTION

It is an object of the present invention to provide a new application method as well as new fluxes, which can be employed for this method. This objective is accomplished by the inventive method, the new flux and the new fluxing agent.

The inventive method for brazing of aluminum and aluminum alloys using a fluxing agent composed of complex fluorides envisions that the fluxing agent contains alkali fluorozincate or mixtures of alkali fluoride and zinc fluoride as the flux, and that brazing is effected at a temperature ranging from 420° C. to 590° C., and wherein alkali refers to potassium, cesium or rubidium.

The alkali fluorozincate or mixtures of alkali fluoride and zinc fluoride have the effect of a fluxing agent at these temperatures. This is a totally unexpected finding. Surprisingly, however, the alkali fluorozincates act as fluxing agents even when the brazing is carried out at temperatures, which are far below the melting point of the alkali fluorozincate employed. The melting points of $KZnF_3$ and $K_2ZnF_4$, for example, are at temperatures of 870° C. and 737° C. Therefore, at temperatures below 600° C., brazing ought not to occur. The following explanation may be advanced. In the absence of solder-forming components, such as silicon, an Al-Si eutectic is formed. Because of electrochemical processes, this generates an alkali fluoroaluminate fluxing agent in situ. For example, it is assumed that $KZnF_3$+Al (from the Al—Si alloy) react with formation of $KAlF_4$ or KF and $AlF_3$ and Zn metal. However, this is only proposed explanation, which might explain the phenomena, such as the brazing process and the formation of Zn.

Mixtures of alkali fluoride (or alkali fluorides) and zinc fluoride provide usable brazings. The molar ratio of alkali fluoride to zinc fluoride may be in the range of about 1:1, for example, from 1:1.05 to 1.05:1. However, one of the two components, particularly the zinc fluoride, can also be present in a larger excess. Preferably, however, alkali fluorozincates are used, since they provide better brazings.

In the context of the present invention, "alkali fluorozincate" refers to compounds of the general formula $(MF)_x \cdot (ZnF_2)_y$, in which M=K, Rb, Cs and $0<x\leq4$ and $0<y\leq4$. "Alkali fluoride" refers to the fluorides of potassium, rubidium and cesium.

Preferably, x and y are whole numbers, namely, independently of one another, 1, 2, 3, or 4; however, x and y may also be in a sub-stoichiometric relationship to one another. In that case, either x, y or both are then larger than 0, but do not represent a whole number. In this case, it is preferred if y is larger than x.

In the context of the present invention, the term "fluxing agent" refers to those compounds which have the desired surface-cleaning effect (especially the removal of oxide layers) during the brazing. The fluxing agent may consist of alkali fluorozincate; other fluxing agents are then not included. The fluxing agent can also contain other fluxing agents besides alkali fluorozincate. For example, the fluxing agent may represent a mixture of alkali fluorozincate and alkali fluoroaluminate, such as potassium fluoroaluminate and/or cesium fluoroaluminate. The alkali fluorozincate may be present as a pure compound or as a mixture of alkali fluorozincates, such as pure potassium fluorozincate or pure cesium fluorozincate. Moreover, the compounds may exist in one or more phases. For example, pure $KZnF_3$ or also mixtures of $KZnF_3$ and $KZnF_4$ can be used. However, appropriate mixtures with different alkali metal cations can also be used.

Preferred flurozincates include potassium fluorozincate and cesium fluorozincate. These can, of course, also be contained as a mixture.

If cesium fluorozincate is contained as the only fluorozincate in the fluxing agent, it is present in an amount of 5 wt.-% or more. Preferably, the alkali fluorozincate is contained in an amount of more than 30 wt.-%, and especially in an amount of 50 wt.-% or more, in the fluxing agent. The percentages are relative to the fluxing agent, which is set at 100 wt.-%. If the fluxing agents are not pure alkali fluorozincates, other fluxing agents represent the remainder of the mixture up to 100 wt.-%, especially fluxing agents composed of potassium and/or cesium fluoroaluminate.

The fluxing agent frequently can be used as such, without the addition of auxiliary materials. For example, solder-plated aluminum sheet can be brazed with pure fluxing agents. Aside from fluxing agents, the ready-to-use compositions may comprise auxiliary materials. The fluxing agents may also contain auxiliary materials, such as binders, dispersants, brazing metal, brazing metal precursors, solder-forming materials, such as metal fluorosilicates, especially alkali fluorosilicates, or stabilizers. In the inventive method, fluxing agents of pure alkali metal fluorozincate, as well as fluxing agents, which additionally contain potassium fluoroaluminate and/or auxiliary materials, can be employed very well.

If binder is contained in the fluxing agent, it is advisably contained in an amount of 10 to 90 wt.-%. If brazing metal is contained in the fluxing agent, it is advisably contained in an amount of 25 to 75 wt.-%. As described in U.S. Pat. Nos. 5,100,048 and 5,190,596, the fluxing agent may contain admixed solder-forming metals, such as silicon, copper or germanium. These are then contained in an amount of about 10 to about 80 wt.-%. The quantities given above may also be greater or less. The effective minimum or maximum amount can be determined by manual trials (brazing experiments).

As a brazing metal precursor, metal fluorosilicate, such as alkali fluorosilicate, for example, potassium hexafluorosilicate, may also be contained. If it is included, the amount advantageously lies in the range from 5 to 95 wt.-%.

The foregoing percents relate to the whole of the fluxing agent, which is set equal to 100 wt.-%.

As shown in German application 196 36 897.9, it is possible to braze without solder, if at least 6 wt.-% of $K_2SiF_6$ is contained in the fluxing agent. The same holds true according to EP-A-810 057 for fluxing agents, which contain 7 to 15 wt.-% of metal fluorosilicate, such as $Cs_2SiF_6$, $CsHSiF_6$, or $CsKSiF_6$. In the case of $K_2SiF_6$, 25 to 50 wt.-% and even up to 75 wt.-% are advantageous. However, even if the metal fluorosilicates are contained in lesser amounts in the fluxing agent, for example, in an amount of 1 to less than 6 wt.-%, the fluxing agent properties with respect to the wetting properties of the surface to be brazed and also the melting point of the fluxing agent are affected positively.

When it is intended to use the fluxing agent in the form of a suspension, dispersing agents may also be contained, which stabilize the suspension.

The fluxing agent can be applied in a known manner on the components of aluminum or aluminum alloys which are to be joined. A dry application based on electrostatic spraying technology is possible because of the good fluidizing properties of the fluxing agents. Alternatively, the fluxing agent may be applied to the materials, which are to be joined, in the form of aqueous or organic suspensions or as a paste. Aqueous or organic suspensions advisably contain 15 to 75 wt.-% of the fluxing agent. Suspensions of the fluxing agent in organic liquids, preferably substances usually used as organic solvents such as alcohols, especially methanol, ethanol, propanol or isopropanol, as well as polyols, can also be used.

Other organic liquids ("carriers") include ethers, such as diethylene glycol monobutyl ether, ketones, such as acetone, esters of alcohols, diols, or polyols and binders for the use as paste are, for example, ethyl cellulose. By means of film-forming agents, usually polymers which are soluble in organic solvents such as acetone, fluxing agents can be applied to the workpiece optionally with solder or a solder precursor and, after evaporation of the solvent, form an adherent solid film. Suitable polymers include, for example, methacrylates. The film-forming agent then evaporates during the brazing. During the application, the brazing metal, if required, may be contained in the fluxing agent (as an admixed powder); it may also already be applied as a plating on the components that are to be brazed or applied additionally to the fluxing agent.

The brazing temperature depends on the solder or the solder-forming metal or the material used. If the soldering metal is liquid at a temperature below 450° C., the process is defined as "soft soldering" or simply as "soldering". If it is a liquid at a temperature above 450° C., the process is referred to as "hard soldering" or "brazing". There are low melting solders, such as zinc-aluminum solders, which can be used for soldering at temperatures above 390° C., or pure zinc solder, which can be used above 420° C. Other solders can be brazed at higher temperatures. Al—Si—(Cu) solders can be used at temperatures of (530° C.) or 575° C. and higher.

In general, a brazing temperature of up to 600° C. is sufficient. Preferably, brazing is carried out at 390° C. to 600° C. and especially at 420° C. to 590° C. at atmospheric pressure. Brazing, for example, in a vacuum with evaporation of the fluxing agent, as described in the JP-A 03/099 795, is not contemplated within the present invention. It is possible to flame braze or furnace braze, especially in an inert atmosphere (such as a nitrogen atmosphere).

Known fluxing agents can be used for the inventive process. For example, the Japanese application 72/293 699 discloses fluxing agents composed of potassium fluorozincate in a specific molar ratio. U.S. Pat. No. 4,645,119 discloses a fluxing agent composed of potassium fluoroaluminate, which also contains potassium fluorozincate. The potassium fluorozincate was used as additive to improve corrosion and not as a fluxing agent. The European patent application EP-A-0 659 519 discloses a fluxing agent for brazing aluminum; this fluxing agent contains potassium fluoride, zinc fluoride and aluminum fluoride within particular ranges. Potassium fluorozincates possibly may be contained here.

In the following, new fluxing agents are described, which can be used in the inventive method and are also an object of the invention.

One object of the invention is a fluxing agent, which can be used to braze aluminum and aluminum alloys and contains alkali metal fluorozincate and brazing metal or, in particular, a brazing metal precursor, as well as, optionally, alkali metal fluoroaluminate and optionally auxiliary materials, wherein alkali refers to potassium, cesium and rubidium. Preferred alkali metal fluorozincates are potassium fluorozincate and/or cesium fluorozincate; a preferred brazing metal precursor is silicon, copper, zinc or germanium or a metal fluorosilicate, preferably an alkali metal fluorosilicate, particularly potassium fluorosilicate and/or cesium fluorosilicate. If desired, conventional auxiliary materials, such as binders, carriers or stabilizers may be contained. From 2 wt.-% of alkali fluorozincate onwards, positive effects on the brazing behavior may already be noted. The auxiliary materials, such as binders, may be contained in an amount of 10 to 90 wt.-%, based on the total weight of the fluxing agent. In accordance with one embodiment, the fluxing agent preferably contains or consists of 5 to 95 wt.-% of alkali fluorozincate (as sole component having flux activity) and 5 to 95 wt.-% of solder or a brazing metal precursor, wherein alkali refers to potassium, cesium or rubidium.

If, in addition to the alkali fluorozincate and brazing metal or brazing metal precursor, alkali fluoroaluminate is contained in the fluxing agent, the amounts preferably are 5 to 90 wt.-% of alkali fluorozincate, 5 to 90 wt.-% of solder or brazing metal precursor and 5 to 90 wt.-% of alkali fluoroaluminate. The fluxing agent may consist of these components or auxiliary materials may be contained in an amount of 10 to 90 wt.-%, based on the total weight of the fluxing agent. Pursuant to a particular preferred embodiment, the fluxing agent contains alkali fluorozincate, alkali fluoroaluminate as well as at least one brazing metal precursor. Preferred alkali fluorozincates include potassium fluorozincate and cesium fluorozincate. Preferred brazing metals include silicon, germanium, zinc or copper or alkali metal fluorosilicate, preferably potassium fluorosilicate or cesium fluorosilicate. The fluxing agent may consist of the components named above. The alkali metal fluorozincate preferably is contained in the fluxing agent in an amount of 2 to 20 wt.-%, the alkali metal fluoroaluminate in an amount of 20 to 80 wt.-% and the brazing metal precursor in an amount of 10 to 50 wt.-%. If desired, conventional auxiliary materials, such as binders, carriers or stabilizers (for the suspension) may be included, preferably then in an amount of 30 to 70 wt.-%, based on the total weight of the fluxing agent.

Yet another object of the invention is a fluxing agent, which can be used for brazing aluminum and aluminum alloys and contains more than 5 wt.-% and preferably more than 5 mole percent, but less than 100 wt.-% of cesium fluorozincate as well as of potassium fluoroaluminate or cesium fluoroaluminate as a remainder up to 100 wt.-%. This fluxing agent preferably contains more than 30 wt.-% and especially 50 wt.-% or more of cesium fluorozincate. It is an advantage of this fluxing agent which, if desired, may contain the usual auxiliary materials such as binders, carriers or stabilizers, that magnesium-containing aluminum alloys can also be brazed very well. This is attributed to the cesium cation. Alternatively, therefore, mixtures of potassium fluorozincate and cesium fluoroaluminate or cesium fluorozincate are also very useful.

Using the inventive fluxing agent, parts assemblies can be produced from brazed parts of aluminum or of aluminum alloys.

The required alkali fluorozincates can be prepared in various ways. For example, alkali fluoride, such as cesium fluoride or potassium fluoride, can be melted in the desired ratio with zinc fluoride. Alternatively, it is possible to work in an aqueous solution. For example, an aqueous solution of alkali fluorides and zinc fluoride can be reacted to form alkali zinc fluoride and the precipitated alkali zinc fluoride may be filtered out, if desired. For this purpose, a zinc fluoride solution which, if desired, has been prepared fresh from zinc oxide and aqueous hydrofluoric acid, is reacted with a potassium fluoride solution, which also, if desired, has been freshly prepared from potassium hydroxide and aqueous hydrofluoric acid. For the working up, the precipitated solid is separated from the aqueous, supernatant solution and then dried. In accordance with a different procedure, a solution of alkali bifluorides (that is, adducts of hydrofluoric acid and alkali fluoride) is reacted with zinc oxide. In this way, the alkali fluoride and/or the zinc fluoride can be produced in solution by an anionic exchange reaction between alkali salts or zinc salts and hydrofluoric acid or alkali bifluoride or ammonium bifluoride.

Information concerning phase diagrams, based on thermal and X-ray analyses, are described by O. Schmidt-Dumonat and Horst Bernefeld in Z. anorg. allgemein. Chem. 287 (1956), pages 120 to 137. Information concerning $Ca_4Zn_3F_{10}$ is provided by D. Babel in Z. Naturforsch. 29a (1965), pages 165 and 166. A new method for preparing fluoro metallates is described by M. K. Chaudhuri, S. K. Ghosh and Z. Hiese in J. Chem. Soc. Dalton Trans. (1964), pages 1763 to 1964.

Contrary to what was assumed in the prior art, alkali fluorozincates are suitable as fluxing agents for brazing aluminum or aluminum alloys, such as Mg—Al alloys at temperatures of 600° C. and below. It is not necessary to work in a vacuum with the vapor of the fluxing agent. The residue is not corrosive and can be painted over. The palette of known fluxing agents is extended in a manner, which could not have been anticipated.

Figure 1:
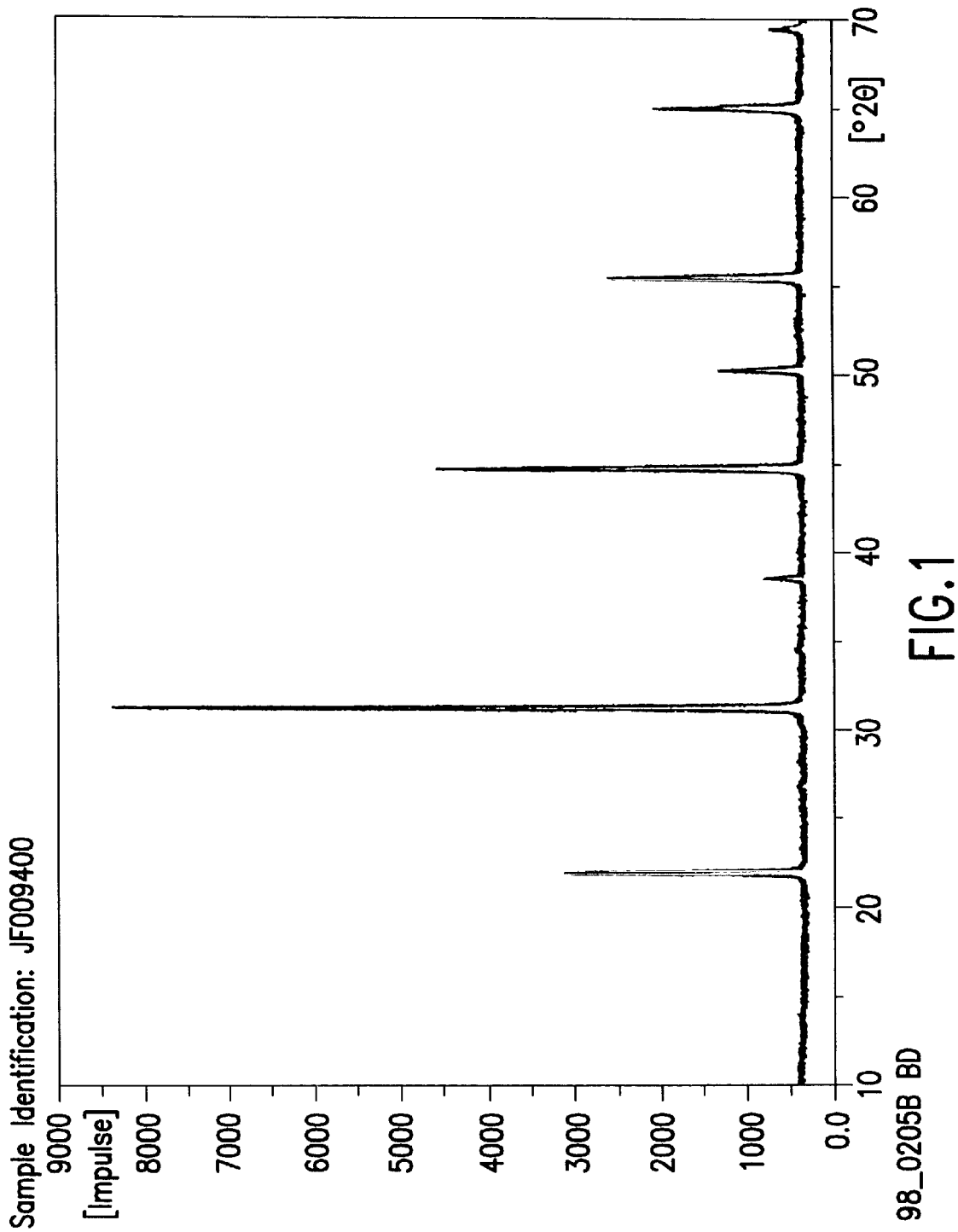
FIG. 1 is an X-ray diffraction spectrum of potassium fluorozincate produced in Example 1.
Figure 2:
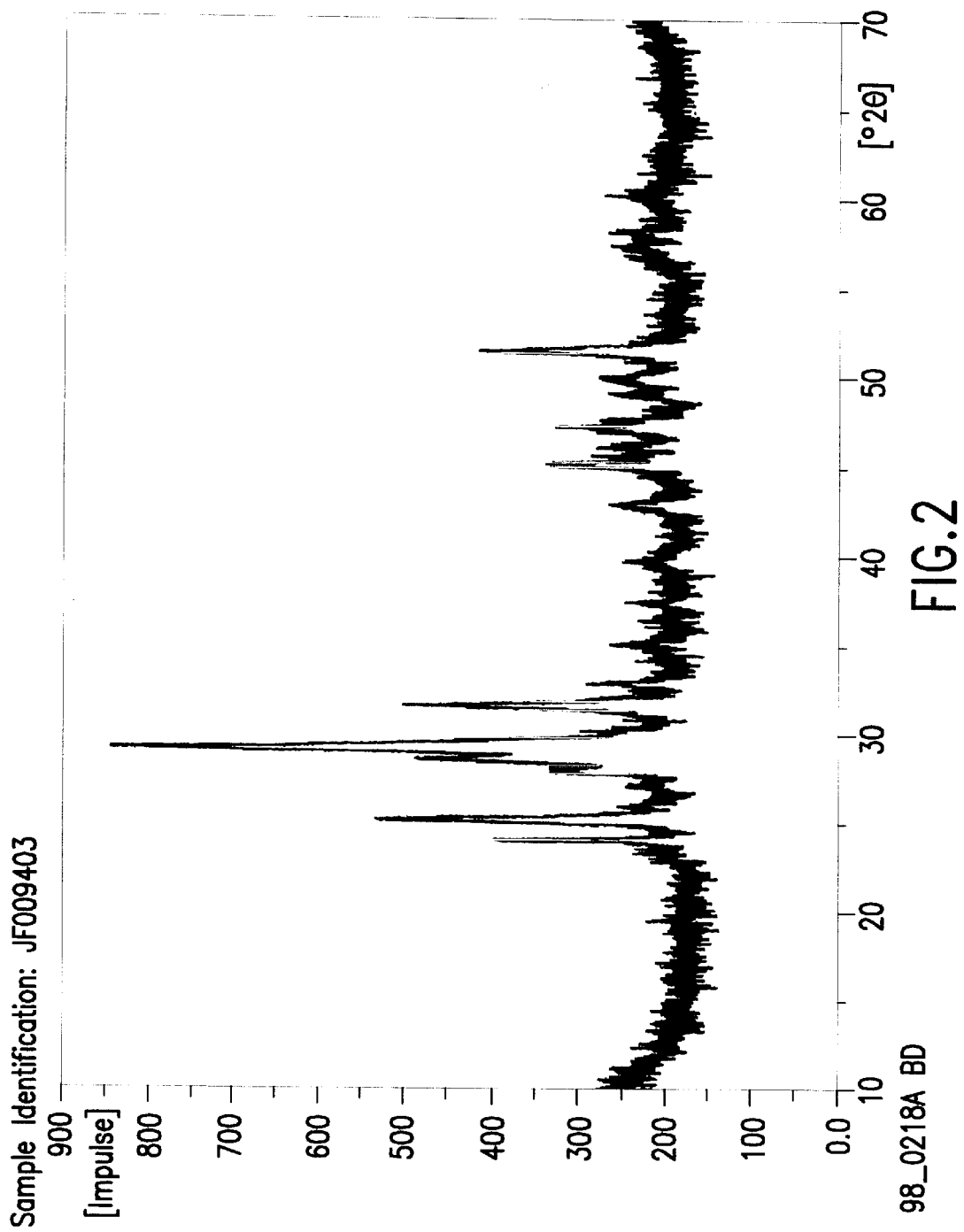
FIG. 2 is an x-ray diffraction spectrum of cesium fluorozincate produced in example 2.
Figure 3:
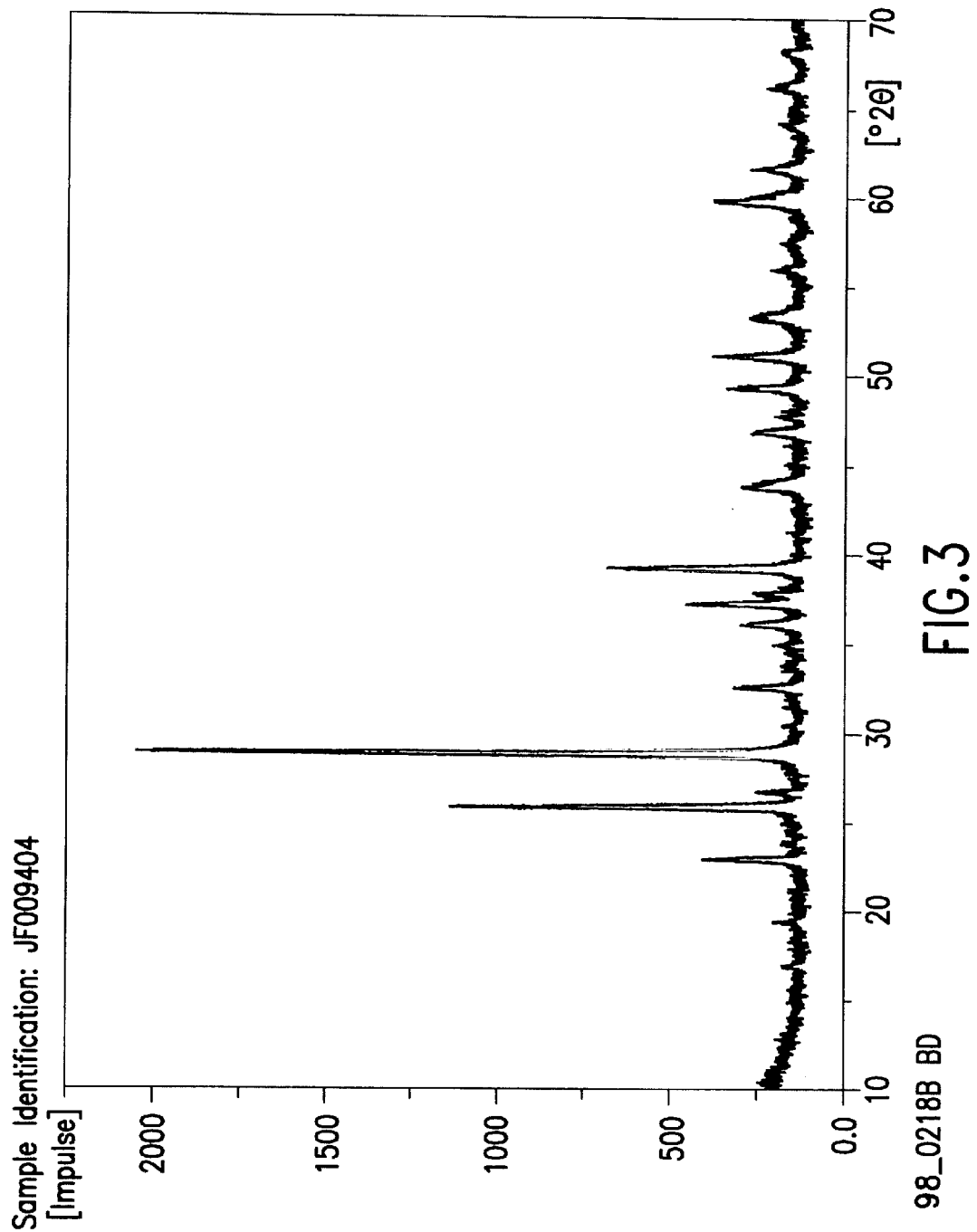
FIG. 3 is an x-ray diffraction spectrum of cesium fluorozincate produced in example 3.
Figure 4:
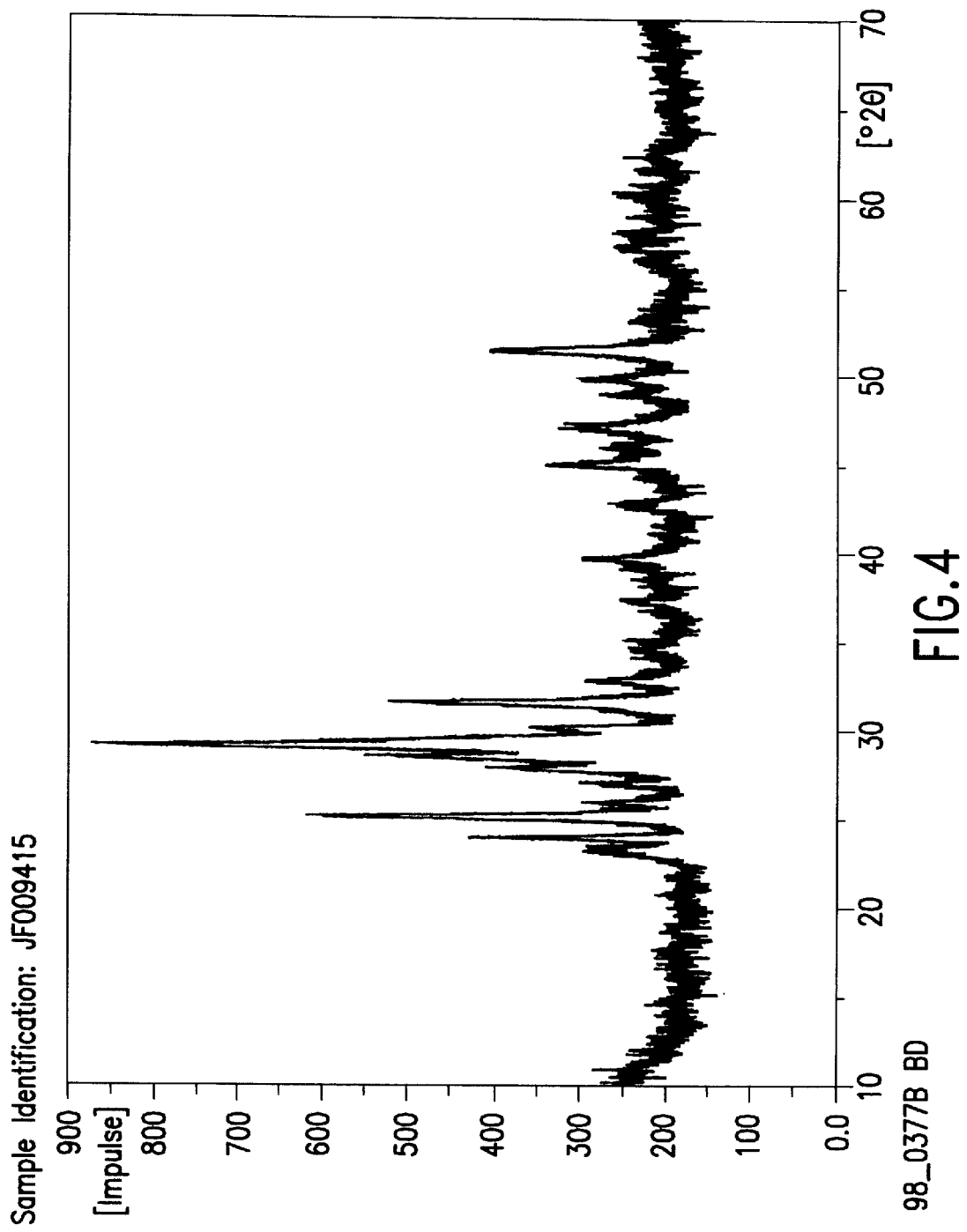
FIG. 4 is an x-ray diffraction spectrum of cesium fluorozincate produced in example 4.
Figure 5:
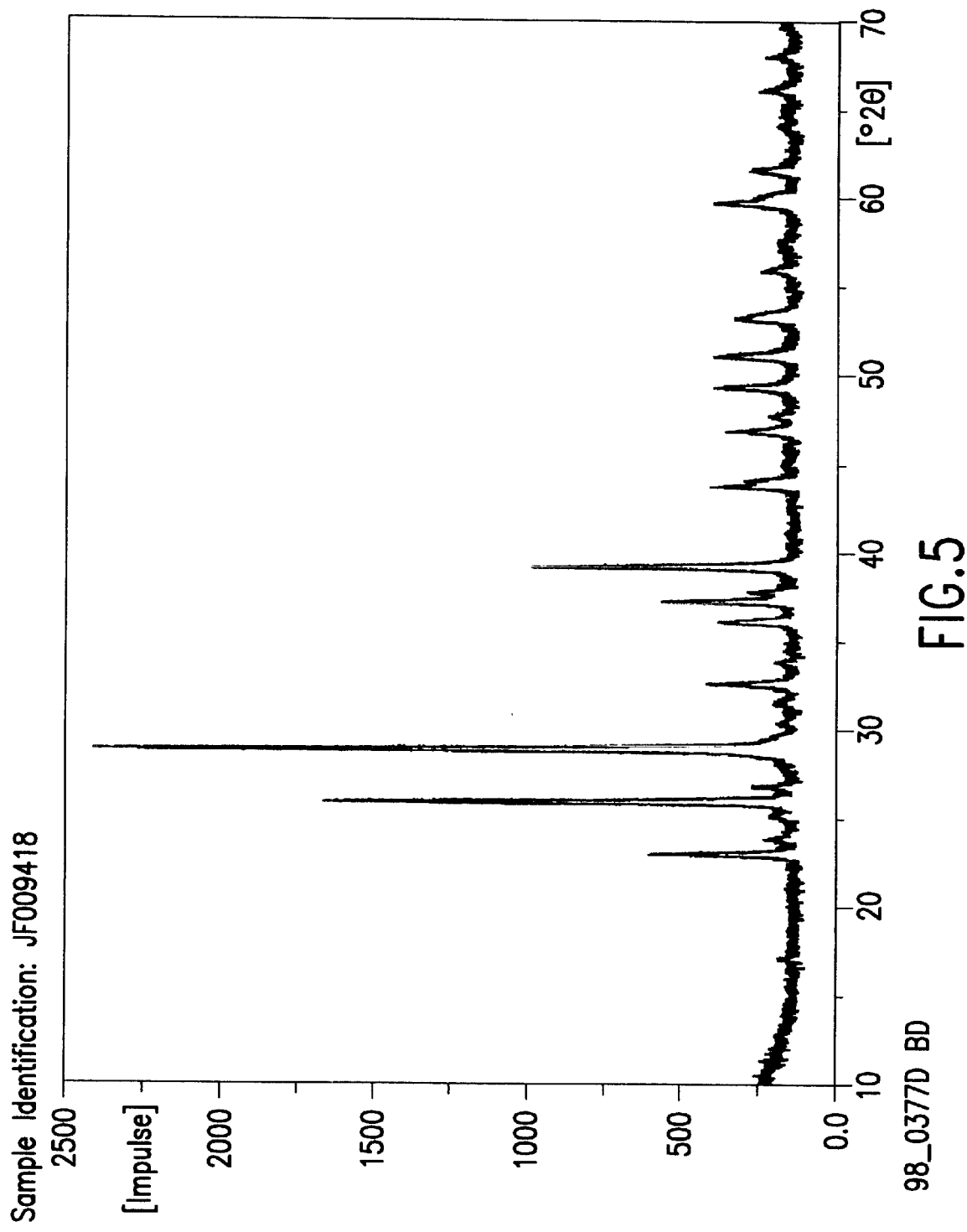
FIG. 5 is an x-ray diffraction spectrum of cesium fluorozincate produced in example 5.
Figure 6:
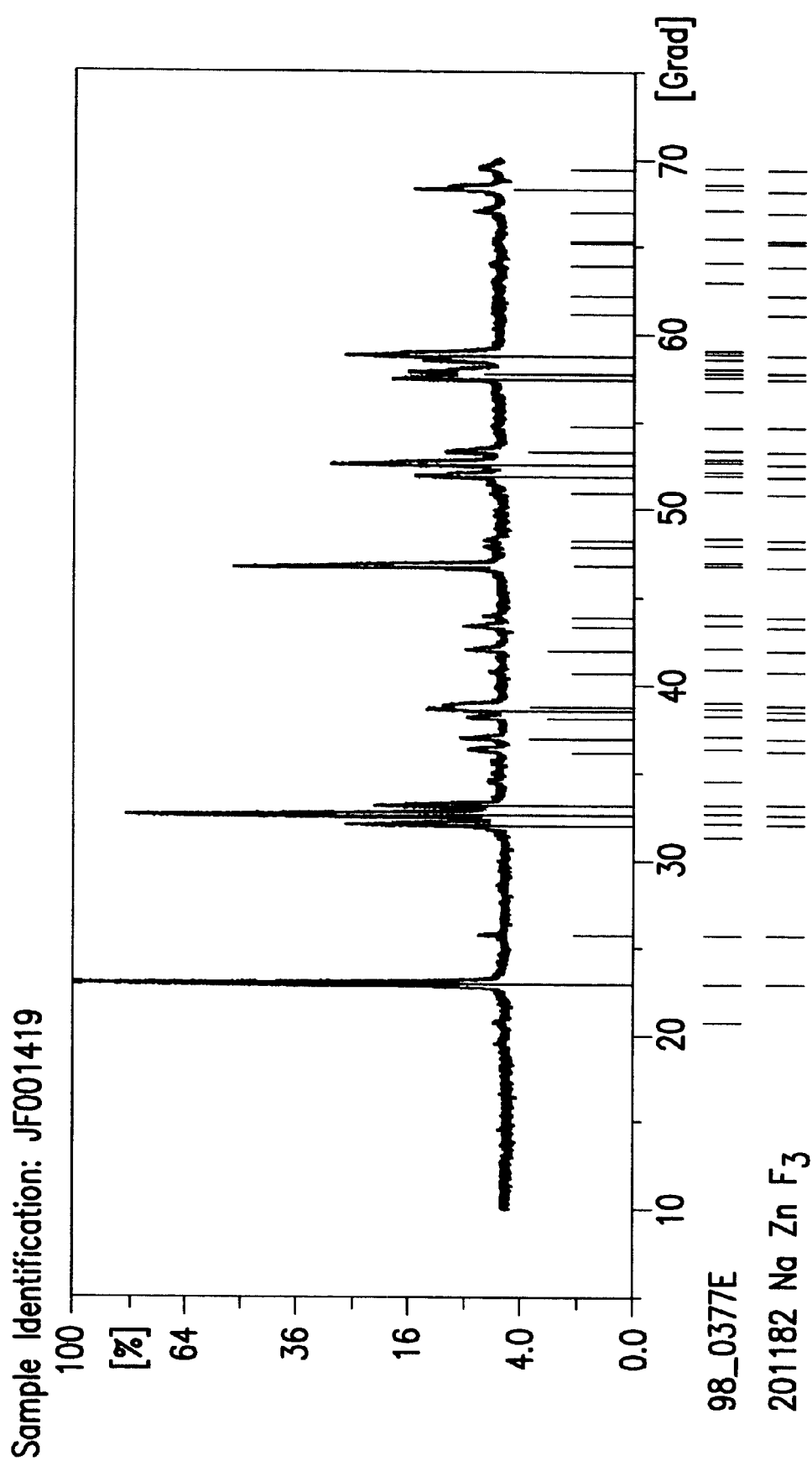
FIG. 6 is an x-ray diffraction spectrum of sodium fluorozincate produced in example 6.
Figure 7:
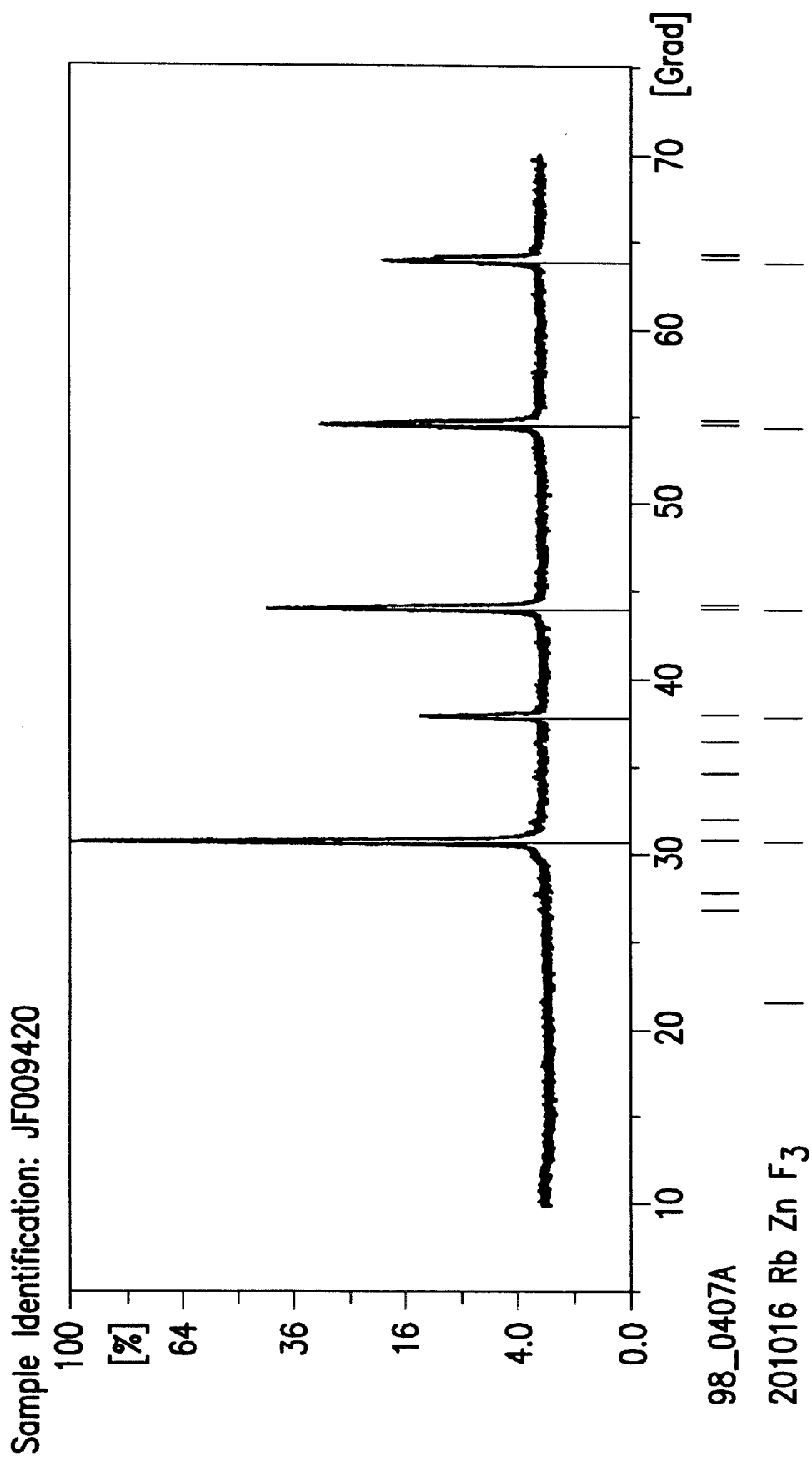
FIG. 7 is an x-ray diffraction spectrum of cesium fluorozincate produced in example 7.

The following examples are intended to explain the invention further without limiting its scope.

EXAMPLES

Example 1

Preparation of Potassium Fluorozincate (JF 009400)

Zinc oxide is reacted with aqueous hydrogen fluoride to form a zinc fluoride solution (Solution 1). Solution 1 is added with stirring to a previously prepared aqueous potassium fluoride/hydrofluoric acid (Solution 2 of 23.3 g of potassium fluoride and 16 g of hydrofluoric acid). Stirring is continued for a further hour and the precipitated solid is filtered out. The solid is dried in a circulating-air oven at 110° C.

Yield: 95.4% of the theoretical

Analysis: X-ray diffraction confirms pure $KZnF_3$; identification with reference spectrum. DTA to 650° C. shows no identifiable phase conversions.

Example 2

Preparation of Cesium Fluorozincate (JF 009403)

Cesium hydroxide (30 g) is reacted with an aqueous solution of hydrofluoric acid to form CsF-HF. To this solution, 16.3 g zinc oxide are added in portions with stirring. The working up is as described in Example 1.

| | |
|---|---|
| Yield: | 52.8% of the theoretical. |
| Analysis: | 33.9% of cesium, 37.9% of zinc |
| | X-ray diffraction no available reference spectrum. |
| DTA: | several onsets, particularly at 368.5° C., 558.8° C. and 664.6° C. |

Example 3

Preparation of Cesium Fluorozincate (JF 009404)

Cesium hydroxide (60 g) is reacted with an aqueous solution of hydrofluoric acid to form CsF-HF. To this solution, 16 g of zinc oxide are added in portions with stirring. The working up is as described in Example 1.

| | |
|---|---|
| Yield: | 52.8% of the theoretical. |
| Analysis: | 49.0% of cesium, 27.2% of zinc |
| | X-ray diffraction, no available reference spectrum. |
| DTA: | small onset 499° C., main peak at 583° C. onset. |

Example 4
Preparation of Cesium Fluorozincate (JF 009415)

As in Example 3; however, stirring is continued for 2.5 hours at about 90° C. The product is worked up as in Example 1.

| | |
|---|---|
| Yield: | 67.3% of the theoretical. |
| Analysis: | 58% of cesium, 26.1% of zinc |
| | X-ray diffraction, no available reference spectrum. |

Example 5
Preparation of Cesium Fluorozincate (JF 009418)

Cesium hydroxide (45 g) is reacted with an aqueous solution of hydrofluoric acid to form CsF—HF. To this solution, 16.3 g of zinc oxide are added in portions with stirring and stirring is continued for 2 hours at 80° C. The working up is as described in Example 1.

| | |
|---|---|
| Yield: | 73.5% of the theoretical. |
| Analysis: | 85.5% of cesium, 36.2% of zinc |
| | X-ray diffraction, no available reference spectrum. |
| DTA: | Onsets at 502.4° C., 556.3° C. and 586.4° C. |

Example 6
Preparation of Sodium Fluorozincate (JF 009419)

Sodium hydroxide (16 g) is reacted with an aqueous solution of hydrofluoric acid to form NaF—HF. To this solution, zinc oxide (32.6 g) is added in portions with stirring. The working up is as described in Example 1.

| | |
|---|---|
| Yield: | 95.0% of the theoretical. |
| Analysis: | X-ray diffraction, identification with reference spectrum 20 11 82. |
| DTA: | Onset at 648.4° C. |

Example 7
Preparation of Rubidium Fluorozincate (JF 009420)

Rubidium hydroxide (20.5 9) is reacted with an aqueous solution of hydrofluoric acid to form RbF—HF. To this solution, 16.3 g of zinc oxide are added in portions with stirring. The working up is as described in Example 1.

| | |
|---|---|
| Yield: | 93.8% of the theoretical. |
| Analysis: | X-ray diffraction, reference spectrum 20 10 16. |
| DTA: | Maxima at 638.6° C. and 683.9° C. |

Brazing Tests
General Brazing Conditions:

On an aluminum or aluminum magnesium coupon (25 mm×25 mm), with or without a solder or solder plating, a defined amount of fluxing agent together with one or two drops of isopropanol are spread by rubbing on the surface of the coupon in order to obtain a uniform distribution of the fluxing agent on the surface. Subsequently, this coupon is provided with an aluminum angle (approximately 45°, length 40 mm, height 5 mm). After waiting until the isopropanol has evaporated, the coupon is then placed into a preheated. brazing furnace (at about 400° C. in the case of ZnAl solders and at 520° C. in the case of AlSi(Cu) solders), through which a controlled atmosphere (nitrogen, dew point −40° C.) is flowing and heated to the brazing temperature (brazing the angle to the coupon at temperatures as high as 600° C.) (so-called CAB brazing processes). Nocolok® is potassium fluoroaluminate.

| Flux/Coverage | 3 g/m² Al 3003 + Al angle | 5 g/m² Al 3003 + Al angle | 7 g/m² Al 3003 + Al angle | 5 g/m² Al 3003 + solder + Al angle | 5 g/m² Al plated with 4050 + Al angle | 5 g/m² Al plated with 4050 + Al angle | 10 g/m² AlMg + solder + AlMg1 angle | 10 g/m² AlM1 + solder + Al angle | 5 g/m² Al + solder AlMgl angle |
|---|---|---|---|---|---|---|---|---|---|
| JF 009400 KZnF₃ | | | | AlSi12 solder 100% brazed | brazed very well | | Zn-solder 1.5 cm not brazed | | |
| JF 009403 CsZnF₃ | | | | | inhomogeneous brazed joint | brazed satisfactorily 6 min | | | |
| JF 009404 Cs₂ZnF₄ | | ZnAl 5/2 brazed 100% | | | brazed very well | | | | |
| JF 009415 CsZnF₃ | | | | | 1.5 cm not brazed | 1.5 cm not brazed | | | |
| JF 009400 JF 009400 + Si-Powder 2:1 | brazed very well 100% | brazed very well, 100% too much solder | | | brazed very well, 100% too much solder | | not brazed | | |
| JF 009400 JF 009400 + AlSi12 1:1 | | | brazed very well 100% | | brazed very well 100% | | | | |
| JF 009403 JF 009403 + AlSi12 1:1 | | | not brazed | | 1.5 cm not brazed | | | | |
| JF 009404 | | | 1.5 cm | >90% | brazed | | | | |

-continued

| Flux/Coverage | 3 g/m² Al 3003 + Al angle | 5 g/m² Al 3003 + Al angle | 7 g/m² Al 3003 + Al angle | 5 g/m² Al 3003 + solder + Al angle | 5 g/m² Al plated with 4050 + Al angle | 10 g/m² Al plated with 4050 + Al angle | 10 g/m² AlMg + solder + AlMg1 angle | 10 g/m² AlM1 + solder + Al angle | 5 g/m² Al + solder AlMgl angle |
|---|---|---|---|---|---|---|---|---|---|
| JF 009404 + AlSi12 1:1 | | not brazed | brazed | | very well 100% | | | | |
| KF + ZnF₂ (spread by rubbing) | | | not brazed | | brazed very well 100% | | | | |
| JF 009404 | | | 15 g/m² | | | | | | |
| JF 009404 + K₂SiF₆ 1:2 spread by rubbing | | | very good | | | | | | |
| CsAlF₄/ JF 009404 | | | | ZnAl 5 solder 100% Zn solder 100% | | | Zn solder not brazed | | |
| JF 009404 JF 009404/ Nocolok ® 1:1 mixture | | | | 4145 solder brazed 100% | | | not brazed | AlSi12 brazed 50% | AlSi 12 brazed 100% |
| JF 009400 JF 009400/K₂SiF₆ 1:2 spread by rubbing | | brazed very well | | | | | | | |
| JF 009400 JF 009400/ Nocolok ® 1:1 mixture | | | | 4145 solder brazed 100% | | | | | |
| JF 009418 | | | | brazed 100% | brazed 100% | | | | |
| JF 009419 | | | | | | brazed only at points | | | |
| JF 009420 | | | | AlSi12 solder brazed 100% | brazed 100% | | 15 g/m² with solder AlSi12 coupon + angle 6063 brazed 100% | with solder AlSi12 coupon 6063 + Al angle brazed 100% | |
| JF 009404 | | | brazed | | | | | | |
| JF 009404 + Si Powder 2:1 | | | well 60% | | | | | | |
| JF 009400 | | | brazed | | | | | | |
| JF 009400 + Sil Flux 2:1 | | | well 100% | | | | | | |
| JF 0094004 | | | brazed | | | | | | |
| JF 009404 + Sil Flux 2:1 | | | well 60% | | | | | | |

What is claimed is:

1. A method of brazing components made of aluminum or aluminum alloys, said method comprising:
   applying a fluxing agent at least to contact areas of said components, said fluxing agent containing at least one alkali fluorozincate and optionally a mixture of alkali fluoride and zinc fluoride, wherein the alkali is selected from the group consisting of potassium, cesium and rubidium;
   assembling the components in a desired position in which the contact areas to which fluxing agent has been applied are in contact with each other, and
   thereafter heating the assembled components at a temperature from 420° C. to 590° C. to form a brazed joint between the components.

2. A method according to claim 1, wherein said fluxing agent comprises at least one alkali fluorozincate selected from the group consisting of potassium fluorozincate and cesium fluorozincate.

3. A method according to claim 1, wherein said fluxing agent comprises at least 5 mole percent of cesium fluorozincate.

4. A method according to claim 2, wherein said fluxing agent comprises at least 30 wt.-% potassium fluorozincate or cesium fluorozincate.

5. A method according to claim 4, wherein said fluxing agent comprises at least 50 wt.-% potassium fluorozincate or cesium fluorozincate.

6. A method according to claim 1, wherein in addition to the alkali fluorozincate, said fluxing agent further comprises at least one auxiliary substance.

7. A method according to claim 6, wherein said at least one auxiliary substance is selected from the group consisting of binders, brazing metal, brazing metal precursors, and stabilizers for suspensions.

8. A method according to claim 1, wherein in addition to the at least one alkali fluorozincate, said fluxing agent further comprises up to 95 wt.-% of potassium fluoroaluminate or cesium fluoroaluminate.

9. A method according to claim 1, wherein said fluxing agent further comprises alkali fluorosilicate, wherein the alkali is selected from the group consisting of potassium, cesium and rubidium.

10. A method according to claim 9, wherein said alkali fluorosilicate is a brazing metal precursor and is present in an amount from 5 to 95 wt.-% of said fluxing agent, whereby said method is adapted for solderless brazing of aluminum or aluminum alloys.

11. A method according to claim 10, wherein said alkali fluorosilicate is potassium fluorosilicate.

12. A method according to claim 1, wherein the fluxing agent is applied in the form of an aqueous or alcoholic suspension.

13. A method according to claim 1, wherein the heating is carried out in a controlled atmosphere or in a non-oxidizing flame.

14. A method according to claim 1, wherein at least one of said components is made of a magnesium-containing aluminum alloy.

15. A fluxing agent for brazing aluminum or an aluminum alloy, said fluxing agent comprising at least one alkali fluorozincate selected from the group consisting of potassium fluorozincate, cesium fluorozincate, and rubidium fluorozincate, and a brazing metal precursor.

16. A fluxing agent according to claim 15, further comprising at least one alkali metal fluoroaluminate, wherein the alkali metal is selected from the group consisting of potassium, cesium and rubidium.

17. A fluxing agent for brazing aluminum or an aluminum alloy, said fluxing agent comprising at least 5 mole percent but less than 100% cesium fluorozincate.

18. A fluxing agent according to claim 17, comprising at least 30 wt.-% cesium fluorozincate.

19. A fluxing agent for brazing aluminum or an aluminum alloy, said fluxing agent comprising from 5 to 95 wt.-% alkali fluorozincate, wherein the alkali is potassium, cesium or rubidium, and 5 to 95 wt.-% of a brazing metal or a brazing metal precursor.

20. A fluxing agent according to claim 19, wherein said fluxing agent comprises at least one brazing metal selected from the group consisting of silicon, copper, zinc and germanium.

21. A fluxing agent according to claim 19, wherein said fluxing agent comprises an alkali fluorosilicate brazing metal precursor.

22. A fluxing agent according to claim 19, wherein said fluxing agent comprises 5 to 90 wt.-% of alkali fluorozincate, 5 to 90 wt.-% brazing metal precursor, and 5 to 90 wt.-% of potassium fluoroaluminate.

23. A fluxing agent for brazing aluminum or an aluminum alloy, said fluxing agent consisting of 5 to 95 wt.-% alkali fluorozincate and 95 to 5 wt.-% of alkali fluorosilicate, wherein the alkali is selected from the group consisting of potassium, cesium and rubidium.

* * * * *